FIG. 1.

Dec. 13, 1938.  F. A. HAYES  2,140,012
VARIABLE SPEED POWER TRANSMISSION MECHANISM
Filed Feb. 18, 1937  7 Sheets-Sheet 4

FIG. 5.

INVENTOR
*FRANK A. HAYES*
BY
*Cooper, Kerr & Dunham*
ATTORNEY

Dec. 13, 1938.     F. A. HAYES     2,140,012
VARIABLE SPEED POWER TRANSMISSION MECHANISM
Filed Feb. 12, 1937     7 Sheets-Sheet 5

INVENTOR
FRANK A. HAYES
BY
Cooper, Kerr & Dunham
ATTORNEY

Dec. 13, 1938.      F. A. HAYES      2,140,012
VARIABLE SPEED POWER TRANSMISSION MECHANISM
Filed Feb. 18, 1937      7 Sheets-Sheet 7

INVENTOR
FRANK A. HAYES
by Cooper, Kerr
& Dunham
ATTORNEYS

Patented Dec. 13, 1938

2,140,012

UNITED STATES PATENT OFFICE 2,140,012

VARIABLE SPEED POWER TRANSMISSION MECHANISM

Frank A. Hayes, Middletown, N. J.

Application February 18, 1937, Serial No. 126,322
In Great Britain February 26, 1936

26 Claims. (Cl. 74—200)

This invention relates to variable speed power transmission mechanisms of the "infinitely variable" type, particularly mechanisms which are to be used where a heavy load has to be started and reversed. In such cases the mechanism is often subjected to stresses which are abnormally high in comparison with those which it must sustain or carry under normal operating conditions, and consequently the mechanism must be designed and constructed to withstand these abnormally high stresses, thus increasing its cost and weight. Although the invention is not limited to any specific type of infinitely variable mechanism it finds important application in mechanisms in which power is transmitted by parts in rolling frictional contact, for instance disks and interposed rollers, especially mechanisms of the toric disk type in which changes of speed ratio are effected by angular movement of the rollers, such angular movement or rocking being preferably effected automatically by tilting the rollers on their contact axes (i. e., the diameters extending between the points of contact of the rollers on the disks), or by shifting the rollers bodily at right angles to their contact axes, or by a combination of tilting and shifting. The resulting automatic rocking adjustment of the rollers is commonly known as "precession" and is explained in my prior Patents Nos. 1,698,229, 1,865,102, and 1,919,218. It is to be understood, however, that change of angularity of the rollers, to vary the speed ratio of the mechanism, need not be produced by precession but can be produced by more or less forcible rocking of the rollers by the operator or attendant, this being the common method prior to the invention of the patent first mentioned above.

In power transmission mechanisms of the type indicated, in which power is transmitted by means of parts in rolling frictional contact, as for example disks and interposed rollers, it is important that no slipping of either rolling part on the other shall occur at any time, for the reason that slippage causes wear and resultant impairment of the contacting surfaces, causing noisy and irregular operation, lessened efficiency, etc. Such effects are particularly serious in friction transmissions employing toric disks and planetary or non-planetary precessing rollers, since wear, especially localized wear, interferes with smooth precession of the rollers and may even prevent such operation altogether. It is therefore necessary to have at all times sufficient pressure between the two surfaces to produce friction adequate to prevent slippage. On the other hand, pressure high enough for transmitting any considerable amount of power often causes a certain deformation of the disks and rollers by compression of each other at their points of contact, even when these parts are made of hardened steel, and this deformation moves like a "traction wave" around the revolving disks and rollers. The successive deformation from normal shape at the points of contact by the pressure, and restoration to normal shape by the elasticity of the metal as the parts revolve, produce "fatigue" of the metal and eventual injury to the contact surfaces by chipping or the like. The fatigue life of these surfaces thus depends in large measure upon contact pressure, and various mechanisms, commonly known as "pressure devices", have been proposed for the purpose of regulating the contact pressure so as to give a pressure more or less in proportion to the load on the transmission mechanism, whereby to prevent unnecessarily high pressures. The importance of avoiding high pressures is further evident from the fact that in these friction transmission mechanisms the fatigue life of the contact surface is an inverse exponential function of the load as expressed by the approximate formula

$$L = \frac{K}{W^{3^{10}}}$$

in which L is the fatigue life, K the constant, W the load. Stated in words, the fatigue life varies, other conditions being the same, inversely as the tenth power of the cube root of the load. Hence if the load be doubled the fatigue life would be only one-tenth as long.

In starting a load from rest more power is required than under normal conditions after the load is started, and if the power is applied more or less suddenly ("shock loading") the pressure necessary to prevent slippage may be many times the normal referred to above. Also, friction transmissions of the variable speed-ratio type, such for example as used in motor vehicles, are usually constructed to cause the mechanism to drop down to the low speed-ratio position when the vehicle is stopped, so that the mechanism will be in the low speed-ratio position when the vehicle is again started. In such speed-ratio position the necessary pressure loading to prevent slippage is normally, in most cases, from two to four times the loading under ordinary running conditions Furthermore, motor vehicles are usually started through some form of shiftable clutch, and in such cases due to unskillful engagement of the clutch shock loads may be and often are imposed during starting which are several times the normal torque of the motor.

While these shock loads only occur over very short periods of time they occur with the transmission set for its lowest speed-ratio, at which speed-ratio even the normal pressure loading is from 2 to 4 times the corresponding loads under ordinary running conditions, and as the shock loads may be from 2 to 4 times the normal power load it is evident that conditions may occur where the pressure load is as much as 16 times that required under ordinary running conditions. From the formula given above it will be seen that if such conditions continued the effect upon the fatigue life would be serious.

The present invention makes it possible not only to eliminate all shock loads from the friction transmission but also to relieve it of all loads in reverse and to greatly reduce the average normal load on low gear ratio.

In the preferred form of the invention the friction transmission, including its pressure-loading device, is bridged by a fixed ratio transmission mechanism, for example a toothed gear train, having approximately the same ratio as the lowest speed-ratio of the friction transmission and connected to the output shaft through a "freewheel" or other form of one-way clutch or "synchromesh" shift for forward movement of the vehicle, and directly to the output or tail shaft for reverse movement, the friction transmission at the same time (i. e., when in reverse) being entirely disconnected from the tail shaft.

In transmission mechanisms of the friction type for motor vehicles toothed gearing is ordinarily used for reverse so that the advantages of the present invention may usually be obtained with the addition of only one more gear wheel. The invention by prolonging the life of the transmission mechanism enables the weight and cost thereof to be materially reduced.

In friction transmissions of the roller and toric disk type in which change of speed-ratio is effected by precession of the rollers, some forms of speed-ratio control mechanism are provided with stops or detents to prevent the rollers from precession to too low a speed-ratio when by rapid precession the ratio is being rapidly decreased under full load. These stops are usually carefully set, but since this setting must allow for spring and play in the control devices it follows that under normal conditions when the vehicle is brought to a stop with no load on the control or even a slight reversed load the rollers may not precess all the way into low speed position. Hence when again starting the vehicle the first action is a further reduction in ratio with corresponding loss in acceleration. Since with the present invention, the toothed gears can determine the low ratio at which the load is started the control may be set to tend to force the rollers into or even beyond their normal low speed position, thus insuring starting at lowest ratio and at the same time eliminating the danger of damage due to the rollers hitting their stops too violently when the ratio is reduced rapidly under load. The invention is particularly advantageous when the transmission ratio is automatically controlled in response to engine speed.

In infinitely variable transmission mechanisms, the expression transmission ratio, or speed ratio, as the expression is used herein, means the ratio which the transmission will give at no load, and which, in the case of disk and friction roller mechanisms is a function of the contact radii from the axis of the disks to the centers of the small areas of contact between the rollers and disks.

The employment of a freewheel clutch in the gear train does not give the usual freewheeling effect so far as the vehicle is concerned, since the power means is always connected to the vehicle through the friction transmission when the main clutch is engaged.

If the ratio is controlled by hydraulic or other fluid-pressure mechanism (of which type of control one form is described in my prior Patent No. 1,865,102, and another in my copending application Serial No. 618,054, filed June 18, 1932), it follows that when the pump or equivalent source of the fluid pressure is connected to the input or driving shaft of the transmission there is no load on the transmission control and hence on the transmission at the instant of starting and the load comes on the friction transmission gradually as the vehicle speed is increased and only assumes full load at the end of low gear operation when the power-load conditions are right for an increase in ratio. Thus the friction transmission is relieved of most of the low gear operation. Or if a governor control is used (of which type of control one form is described in my prior Patent No. 1,958,303), the friction transmission would be relieved of practically all of the low gear operation.

Figure 1:
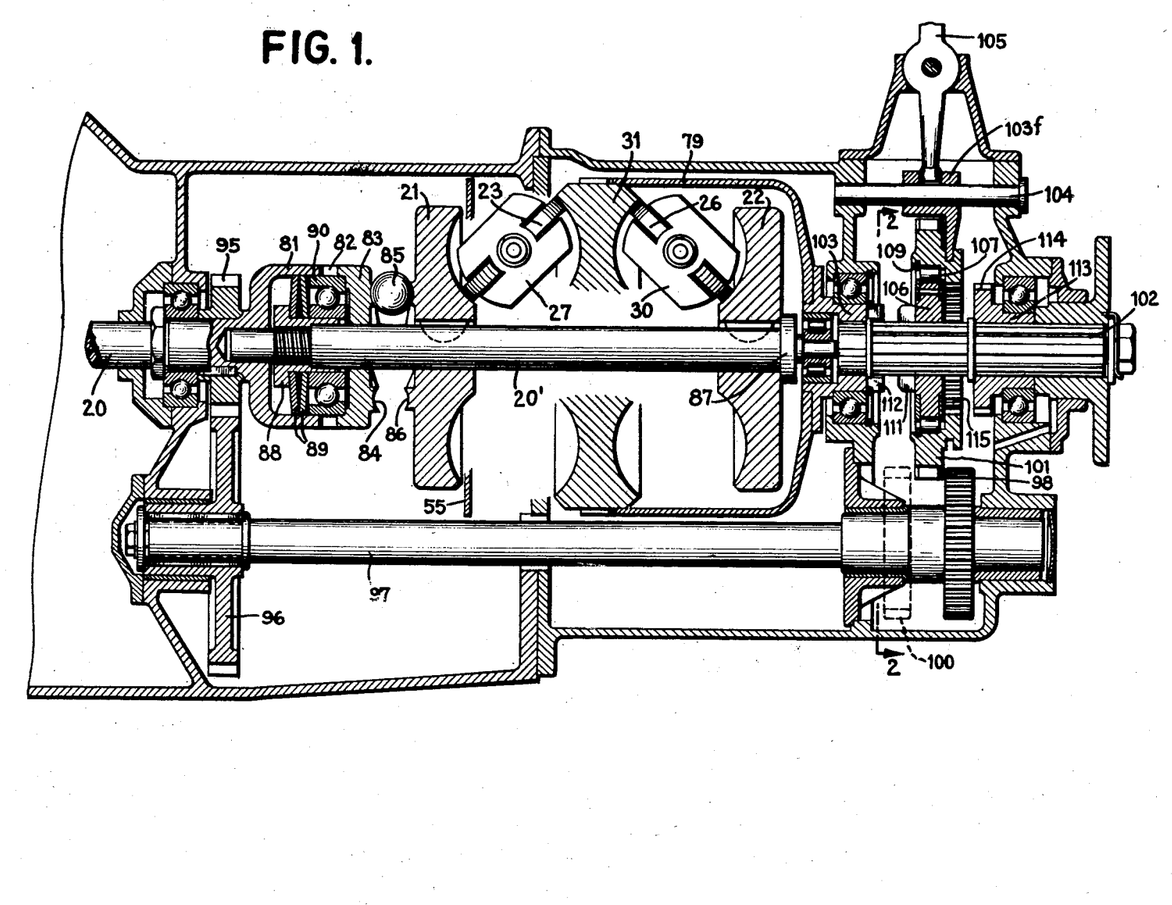
Fig. 1 is a longitudinal section of the transmission embodying the invention in which the gear drive is carried from the input shaft to the output shaft through an auxiliary or jack shaft.
Figures 15, 16, 17:
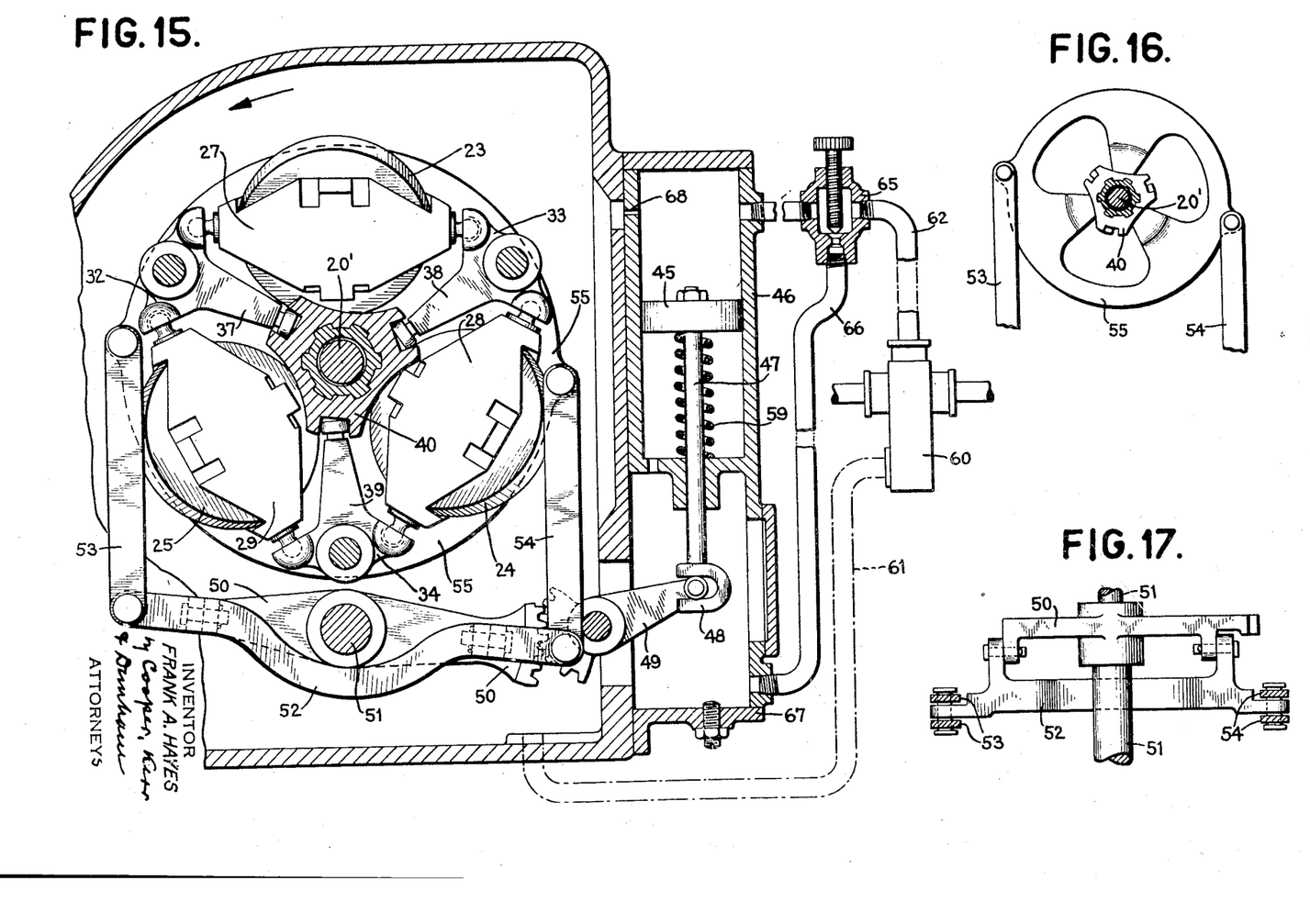
Fig. 15 is a cross section about on a plane indicated approximately by the line X—X of Fig. 5, illustrating a convenient way of mounting the rollers for precession and also showing a simple hydraulic speed-ratio control mechanism which is torque responsive.
Fig. 16 is a detail elevation of the speed-ratio control annulus which is actuated by the piston shown in Fig. 15.
Fig. 17 is a detail plan view of the lever system by which the movement of the speed-ratio control piston shown in Fig. 15 is communicated to the control annulus shown in Figs. 15 and 16.

Referring first to Figs. 1, 15, 16 and 17, the two-part driving or main shaft of the transmission mechanism is shown at 20—20' with toric driving disks 21, 22 keyed on part 20', and friction rollers 23, 24 25, 26 cooperating with the grooves in the disks and rotatably mounted in carriers 27, 28, 29, 30 which are themselves pivotally mounted in rocking supports for precession in the usual way. Two sets of rollers are indicated in Fig. 1. Each set consists of three rollers, each roller of each set cooperating with the groove in the adjacent driving disk and with the adjacent groove in the middle or driven disk 31, which latter is rotatable about the axis of shaft 20'. The rockers 32, 33, 34, of the first set of rollers, Fig. 15, are pivotally mounted on a fixed support (such as 35, Fig. 5) and the rockers (not shown) of the second set of rollers are also mounted on a fixed support. Such a support for the second set of rockers is shown at 36, Fig. 5, carried by a sleeve 36' carried by support 35. The rockers of the first set are equipped with arms 37, 38, 39, extending radially inward into engagement with inclined slots in a control and equalizing member 40 encircling the shaft 20'. It will be observed that if the member 40 is given a slight movement of rotation the rockers will be rocked on their pivots, thereby shifting the roller carriers and rollers bodily in a direction more or less parallel to the axis on which the carriers rock in the precessional adjustment of the rollers, or tilting the rollers and carriers on roller-diameters lying between the points of contact of the rollers and disks, or imparting a combination of both such movements; with the result that the rollers (and carriers) are caused to rock on their axes of precession, thus varying the speed-ratio of the transmission mechanism. In the construction illustrated in Figs. 5, 15, 16, 17 the control member 40 is mounted on a sleeve 41 extending through the middle or driven disk 31 and carrying on its rear end a similar control member 42 having inclined slots (inclined in the direction opposite to the inclination of the slots in member 40) to engage the rocker arms of the rear set of rollers, one of which arms is shown at 43, so that rotation of member 40 will rotate member 42. The sleeve 41 has a slight clearance between it and the parts inside and outside of it, to permit axial movement of the sleeve and its control members in either direction to "equalize" the two sets of rollers, that is, to insure that the two sets will always take or assume the same speed-ratio position. The clearance referred to also permits radial movement, in all directions, of either or both control members, to "equalize" the rollers of each set among themselves. Equalization is now a well known function in toric disk and roller transmission mechanisms, and it is therefore deemed unnecessary to explain the same herein.

In the construction illustrated, the desired movement of rotation is imparted to the control members 40, 42 from a piston 45 movable in a fluid-pressure cylinder 46 and having a rod 47 provided with a recessed head 48 engaging a rock arm 49 geared to a lever 50, fulcrumed at 51. On the side of this lever is a pivoted ball 52 connected at its ends by links 53, 54 to opposite points on a control ring or annulus 55. It will therefore be seen that as the piston 45 moves axially in its cylinder the lever system 50—52 will be rocked correspondingly, thereby rotating the annulus 55 and with it the combined control and equalizing device composed of members 40, 41, 42. The connection of the links 53, 54 to the ball 52 and the control annulus or ring 55 is loose, so as to permit free movement of the aforesaid device in its equalizing function. For the same reason the ball 52 is provided, instead of connecting the links directly to the lever 50.

In the construction illustrated in Fig. 15 the fluid pressure for advancing the piston 45 against the tension of its returning spring 59 is provided by oil taken from the transmission casing by a gear pump 60 (through a pipe indicated in dotted lines at 61) and delivered to cylinder 46 through a pipe 62. Pump 60 is preferably driven by the input or driving shaft, so that the pressure so produced on the piston will depend upon the speed of said shaft thus making the pressure, and hence the movement of the piston, "torque responsive".

In the pipe 62 is a valve 65 controlling a by-pass pipe 66 leading to the piston casing 67 for return of part of the oil from the pump to the transmission casing. By adjustment of the valve the relative amount of oil by-passed to the casing can be regulated, thus predetermining the angular speed (of the pump-driving shaft) at which sufficient pressure is imposed on the speed-ratio control piston 45 to advance the latter and so cause the speed-ratio of the transmission mechanism to be increased. The valve may, if desired, be located for convenient adjustment by the driver or operator, and as indicative of this arrangement I have shown pipe 62 broken on opposite sides of the valve and pipe 66 broken below the valve. It will be noted that as the vehicle is slowed down for any reason the decreasing speed of the pump shaft and consequent decrease of pressure on the piston permit the spring 59 to retract the piston, the oil above the piston being thus returned to the piston casing through valve 65 and pipe 66. To eliminate all possibility of the mechanism being locked, or of the piston not being returned (by its spring) to the desired low speed-ratio position when the pump shaft is not rotating, as might happen if the valve 65 is improperly set, thereby trapping oil above the piston, a small vent 68 may be provided at a suitable point above the piston, opening into the casing of the transmission mechanism.

The mechanism shown in Figs. 15, 16 and 17 is illustrated and described herein as a simple and convenient construction of the type which I prefer, but I wish it to be understood that the invention is not confined to any particular type of mounting of the rollers or any particular type of speed-ratio control mechanism.

From the disk 31 the power is transmitted by a drum or casing 79 to a driven or tail shaft from which power is in turn transmitted to the load. It will be observed that the friction transmission mechanism provides a driving element, which may comprise the driving shaft and the driving disks, and a driven element which may comprise the driven shaft as well as the driven disk. It will be evident too that the drive may be in the reverse of the direction described above, that is, instead of the power being transmitted from the disks 21, 22 to the middle disk 31 the power may be transmitted from the latter disk to the disks 21, 22. In either case the main clutch (if one is used) would be located between the engine or other prime mover and the element or shaft to which the power of the prime mover is applied.

Figure 5:
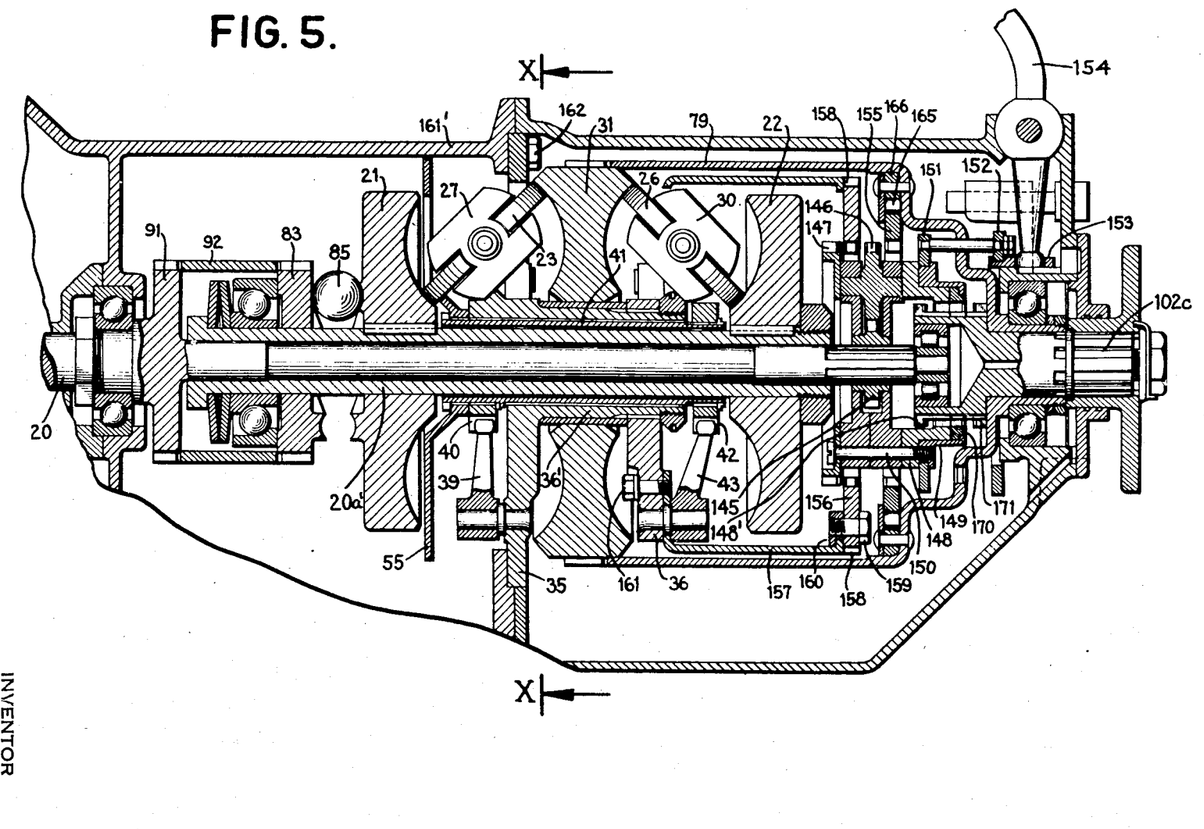
Fig. 5 is a transmission similar to Fig. 1 in which a planetary gear train is used and the drive is transmitted to the gears through a central shaft while the friction transmission drive is taken through a tubular shaft surrounding the first mentioned shaft.

Referring now to the embodiment illustrated in Fig. 1, the shaft 20 is provided with a bell or enlargement 81 having teeth 82 cooperating with similar teeth on a cam member 83 rotatable on shaft 20' and formed with cam grooves 84 to cooperate with balls 85 which cooperate with similar cam grooves 86 on the disk 21. It will be seen that torque applied to cam 83 tends to cause the balls to ride up the cam surfaces and thereby separate the cam and the disk. The resultant pressure is transmitted through the disks and rollers, collar 87 and nut 88, thence through spring washers 89 and thrust bearing 90 back to the cam member 83. The construction of the pressure device shown in Fig. 5 is the same, except that in lieu of a bell or enlargement such as shown in Fig. 1 cooperating directly with the cam member 83 the shaft has a toothed flange 91 connected to the cam by a toothed sleeve 92. The operation of the pressure device is described in greater detail in my copending application Serial No. 618,054.

Figures 2, 3:
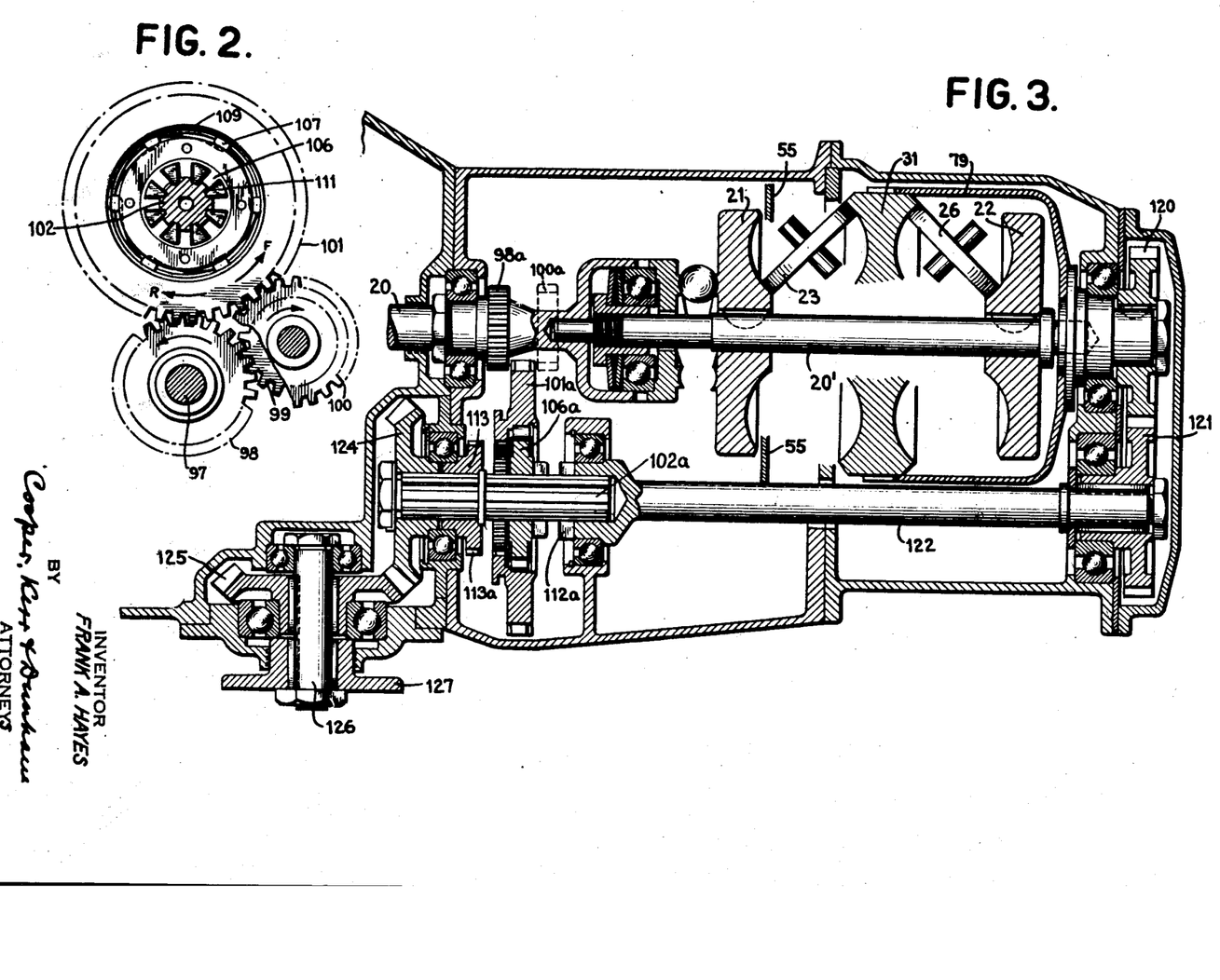
Fig. 2 is a cross-section of Fig. 1 on the line 2—2, showing the arrangement of the gearing at the output end of the transmission.
Fig. 3 is a transmission similar to Fig. 1 but designed for rear-engine or front-wheel drive vehicles.

Referring again to Fig. 1, the drive through the disks and rollers is paralleled by toothed gear mechanism comprising a gear 95 mounted on and driven by shaft 20, meshing with a gear 96 splined or otherwise mounted on a countershaft 97 carrying at its rear end a gear 98 meshing with a gear 99. The latter gear is between the observer and the plane of Fig. 1 and hence does not appear in the figure, but is shown in Fig. 2. This gear 99 is coaxial with and connected to a gear 100, shown in Fig. 2, and indicated in dotted lines in Fig. 1. The two gears 98 and 100 are arranged for meshing with a gear 101 shiftable axially on the driven shaft 102, on which the hub or sleeve 103 of the drum 79 is rotatably mounted. Thus when gear 101 is shifted leftwardly it meshes with gear 100 to give "forward" drive of the driven shaft, and when shifted rightwardly it meshes with gear 98 for "reverse" drive, as explained below. Gear 101 is shifted in either direction by a fork 103f slidable on rod 104 by means of a lever 105. It will be recognized that the gears 98, 99, 100 are similar to the forward and reverse gear-assembly commonly found in the conventional sliding gear transmission mechanism.

Gear 101 is a ring gear forming the driving or outer member of a free-wheel clutch having a driven cam member 106 and interposed rollers 107. The driven member is splined to and slidable on shaft 102, and the bore of gear 101 is provided with a snap ring 109 which confines the rollers, causing them to move endwise with the gear. Similarly, the driven member 106 is constrained to move axially with rollers 107 and gear 101 by the flanges on the sides of said member. Sliding movement of gear 101 therefore shifts the whole freewheel clutch assembly on shaft 102. Member 106 is provided with dogs or teeth 111 to mesh with similar teeth 112 on sleeve 103 when gear 101 is shifted to the left. This completes the driving circuit or path, as sleeve 103 is then connected to the shaft 102 through the splines on the latter and on the driven clutch-member 106.

With the gear 101 meshed with gear 100 it will be seen that when the friction transmission speed-ratio control (whether torque-responsive or not) is set for a ratio slightly below that of the gears, or when with torque-responsive control the control is left unloaded (as when the main clutch of the vehicle is disengaged), the drive will be taken through the gears and with it any shock loading due to engaging the main clutch. If the friction transmission ratio is responsive to engine speed the gears will not only take the loads due to clutch engagement but will continue to drive the vehicle until the desired (predetermined) engine speed is attained after which the friction transmission will tend to change to a ratio greater than the gear ratio, thus gradually assuming the whole driving load. As the speed-ratio of the friction transmission increases, clutch member 106 will be driven faster than gear 101, thus releasing the freewheel clutch rollers 107 so that the gears will then merely idle at relatively slow speed just as the gears in the ordinary sliding gear transmission do in "direct" drive.

When the vehicle is slowed down to a stop with the main clutch disengaged the friction transmission ratio is brought to low, and this is slightly less than the ratio of the gears. This causes the freewheel clutch to engage with slight pre-load ready for the start. An ideal condition is thus established for the operation of the clutch as it prevents backlash and the placing of a momentary load on the friction transmission when starting. The friction transmission at the same time has plenty of backlash to prevent loading thereof since during the stopping operation the load on the pressure device has been reversed.

Gear 101 is shown in the neutral position in Fig. 1, that is, disengaged from both gears 98 and 100, but ordinarily this position would be used only when bringing the vehicle to a permanent stop, as in ordinary traffic stops the clutch pedal is depressed and the main clutch is thus kept disengaged, gear 101 being left in the forward position ready for starting again. In the neutral position of gear 101 there is no drive to shaft 102 since teeth 111 and 112 are disconnected and the gear is out of mesh with both gears 98 and 100.

Reverse drive is obtained by shifting gear 101 towards the right to cause it to mesh with gear 98 and also connect it with clutch member 113 through teeth 114 on the latter and internal teeth 115 on the gear.

No damage can arise as a result of the friction transmission having its control set for a slightly different ratio than the gears. This is necessary not only to ensure that the friction transmission takes no load but also to provide some speed differential between the teeth 111 and 112 to secure proper meshing thereof. However, it should be borne in mind that the speed-ratio of a friction transmission mechanism is not a fixed quantity like that of a gear train but varies (for any given roller position) from no load to full load in each direction over a range amply sufficient to meet requirements.

Fig. 3 shows a mechanism similar in principle to that of Fig. 1 but designed for automotive use when the engine is at the rear and the rear wheels of the vehicle are the driving wheels, or when the engine is at the front and the front wheels are the driving wheels. For such purpose the drum 79 is connected by gears 120, 121, to shaft 122. The latter supports one end of the driven shaft 102a and is equipped with teeth 112a for engagement with teeth on the driven clutch-member 106a splined on shaft 102a. The toothed driving clutch-member is provided with internal teeth to engage teeth 113a on the sleeve 113 keyed on the driven shaft 102a on which is keyed a bevel gear 124 driving the gear 125. The latter gear is keyed to shaft 126 to drive the driving flange 127. Shaft 126 is, for convenience, shown in the plane of the paper on which the figure is printed, but it may be arranged at any desired angle thereto. Gear 98a, driven by shaft 20, corresponds to gear 98 of Fig. 1 and drives a gear (not shown) corresponding to gear 99 (not shown) coaxial with and connected to a gear corresponding to gear 100 and shown in dotted lines at 100a in Fig. 3. For forward drive the freewheel clutch is shifted to the right (by a fork and shift lever, not shown) to mesh the driving clutch member 101a with gear 100a, and reverse drive is obtained by shifting the clutch to the left to mesh the driving member with gear 98a. Otherwise the operation of the mechanism is the same as in Fig. 1.

Figure 4:
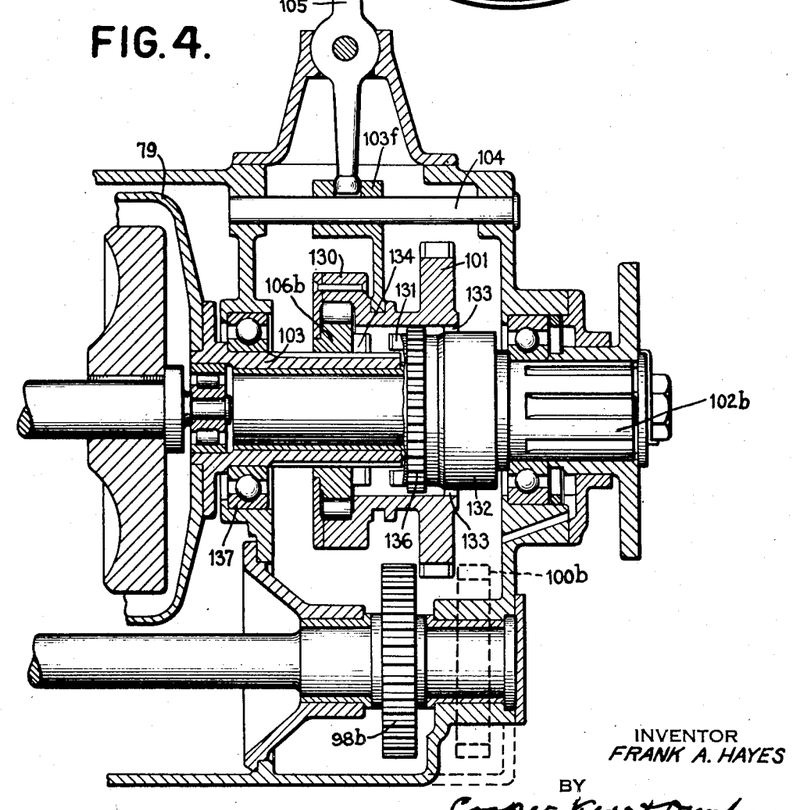
Fig. 4 shows a modified arrangement of the gear shift shown in Figs. 1, 2 and 3, to facilitate shifting.

Fig. 4 illustrates a preferred form of gear shift, designed to provide better operating conditions for the freewheel clutch and easier shifting from neutral or reverse into forward speed position.

In shifting from neutral to forward position with the arrangement of Fig. 1, the gears are first meshed, thus connecting them to the driven shaft 102, then further movement of gear 101 engages teeth 111, 112, thereby connecting the friction transmission mechanism with the driven shaft and with the gear mechanism. During this latter part of the shift these teeth may not be in proper position for easy meshing. But since the drive is already connected to the tail shaft through the gears it would be necessary to start the vehicle through the gears in order to obtain the necessary relative motion of teeth and this relative motion would be slow because of the small difference in ratio between the gears and the friction drive. It will also be observed that in reverse where the freewheel clutch provides easy shifting there is a fairly high speed movement in this clutch and as designed it would at the same time be subjected to a large part of the tooth load imposed on gear 101. It is clear that the operation of the structure shown in Fig. 3 is the same as that just described in connection with Fig 1.

In the construction shown in Fig. 4 these difficulties are obviated. It will be seen that gear 101 is provided with a hub 130 which extends to the left and the freewheel clutch is located at the extreme left-hand end of this hub. Also, the driven shaft 102b is provided with teeth 131 and a cylindrical portion 132 which latter is made a running fit in the inside bore of the clutch teeth 133 and teeth 131 are placed within the gear teeth 136 so that the tooth load imposed on gear 101 is carried through teeth 131 during forward drive to the part 132 of shaft 102b. As gear 101 and shaft 102b are rotating at the same speed when the gear teeth are loaded, there is no rubbing under load between teeth 133 and part 132, and the freewheel clutch is relieved of all tooth loads. It will also be seen that the driven member 106b of the freewheel clutch is connected at all times to the sleeve 103 of drum 79 through the splines on the two parts. Hence for forward drive, which in this case involves shifting to the right, the gears 101 and 100b (corresponding to gear 100 of Fig. 1) are first meshed while the driven shaft 102b is disconnected, and the transmission parts may therefore be freely spun to enable this to be accomplished. The shift is then continued and the driven shaft 102b is smoothly connected through the teeth 134 and 131 as the teeth 134 may be freely moved by the main friction clutch. For reverse the gear 101 is shifted to the left to mesh with gear 98b, and here again the freewheel clutch is relieved in a similar manner of tooth loads. In reverse, teeth 133 on the inside of gear 101 are meshed with teeth 136 on shaft 102b.

This form of gear shift also lends itself readily to the use of helical gears, the teeth on gears 98 and 100b being R. H. or L. H. spiral and those on 101 L. H. or R. H. spiral, depending upon the directions in which the parts are to rotate relatively to each other. For forward drive the thrust would be taken by bearing 137 and there would be no tendency to pull out of mesh on reversal of load since the freewheel clutch prevents reversal of load. In reverse if the teeth 133 and 136 are made the same hand spiral as gear 101 and of appropriate angle they would prevent demeshing on reversal of load in reverse.

In the embodiment shown in Fig. 5 the drive shaft 20 passes right through to the rear end of the transmission where it is splined to the sun gear 145 of the planetary train of which pinion 146 is one of the planets. The cage in which the planet gears are journaled is made in halves and has secured on the left-hand side thereof the gear clutch member 147 and on the right-hand side the clutch member 148 and flange member 149, the whole being held together by screws (one of which is shown at 150) so as to be slidable on the shaft 20 by means of shifter ring 151. This shifter ring is connected to another shifter ring 152 which is in turn rotatable in shifter fork 153 operated by the hand lever 154.

For forward speeds this planetary assembly is shifted to the right by hand lever 154, thus meshing the planet gears 146 with a ring gear 155, and engaging clutch member 147 with a stationary ring gear 156 which is secured to a drum 157 by teeth 158, screws 159, and clamps 160. Drum 157 is in turn secured to the stationary member 36 and is connected thence to the stationary reaction member 35 of the friction transmission through the screws 161 and sleeve or hub 36'. This member or spider 36 is splined to the hub 36', and the reaction member 35 is secured to the casing 161' by screws 162.

The ring gear 155 forms the cam of a freewheel clutch assembly having rollers 165 and an outer ring 166, the latter being fastened to the drum or casing 79.

The drive in Fig. 5 is transmitted to casing or drum 79 through the friction transmission as follows: Shaft 20 is provided with a flange 91 having teeth which mesh with corresponding teeth on the front end of sleeve 92, which is provided with similar teeth on its rear meshing with the teeth on the pressure device cam 83, as previously described. From cam 83 the drive is transmitted to disks 21 and 22 through balls 85 as in the embodiment of Fig. 1, the only difference being that the friction-train parts are mounted on the hollow or tubular shaft 20a' instead of on a solid shaft. Disks 21 and 22 transmit the drive to middle disk 31 and drum 79 through the rollers.

A clutch member 170 is carried by the planetary element to slide therewith but be free to rotate independently thereof. This clutch member is connected to the planetary element by the flange member 149 and is splined to the tail shaft 102c to rotate therewith. The clutch member 170 is provided with teeth which are formed by deepening the above mentioned splines (in the radially outward direction) and in the right-hand or forward drive position of the clutch member said teeth are adapted to mesh with teeth 171 on the rear portion of drum 79 thus enabling the tail shaft to be connected to the friction transmission for forward speeds and disconnected for neutral and reverse.

Assuming (in Fig. 5) that the shift is in forward position, i. e., with driven shaft 102c to be driven in the opposite direction to shaft 20, and the friction transmission set for a ratio slightly lower than that of the planetary gears; and that the vehicle or load is imposed by connecting shaft 20 to the engine or power means through the medium of the usual main clutch of the vehicle: it will be seen that the whole driving load is taken through shaft 20 to sun gear 145, from the latter to planet gears 146, ring gear 155, freewheel clutch parts 165, 166, drum 79, teeth 171, and clutch member 170 to driven or tail shaft 102c. As the speed increases and/or the friction transmission changes to a ratio higher than the gears, the friction transmission assumes the whole load and the gear train merely idles at low speed. Though possible it is not advisable to attach gear 145 to an extension of the tubular shaft 20a', in which case the friction transmission would correspond to the construction shown in Fig. 1. In such case, while the friction transmission in such arrangement would be relieved of all driving loads at starting, the pressure device would still be subjected to these loads so that the rollers and disks, though idling as far as the drive is concerned, would be subjected to full pressure and the fatigue effects resulting therefrom.

Reverse is accomplished in Fig. 5 by shifting the planetary element to the left so as to mesh the planet gears 146 thereof with the stationary ring gear 156, and connect the cage element with the driven shaft 102c through clutch element 148 and teeth 148' on said shaft. Thus the drive is reversed by causing the shaft to rotate in the same direction as shaft 20.

Figures 6, 8, 9:
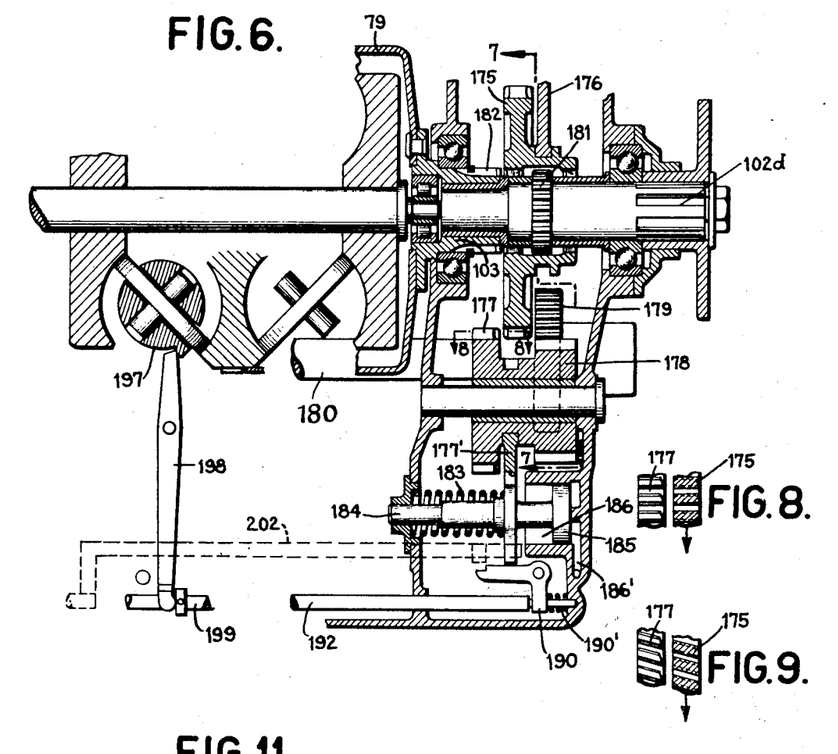
Fig. 6 shows a further embodiment of the invention and is a main longitudinal section through the friction transmission (only part of which is shown) and through the idler gears of the reverse gear mechanism. This figure also shows a preferred method of tripping the automatic shift latch by action of one of the roller carriers of the friction transmission as the angular rocking movement of the roller brings it into the low speed-ratio position, thus synchronizing the friction transmission mechanism and the gear ratio at the instant of meshing of the gears.
Figs. 8 and 9 are part views on line 8—8 of Fig. 6 showing the chamfering of the gear teeth for permitting meshing in one direction of relative motion only, Fig. 9 being a similar view to Fig. 8 but with helical teeth having a helix angle to tend to shift the idler out of mesh when the friction transmission assumes the load.

The embodiment shown in Fig. 6 illustrates an automatic gear shift for lowest ratio forward speeds to replace the freewheel clutch.

Figure 7:
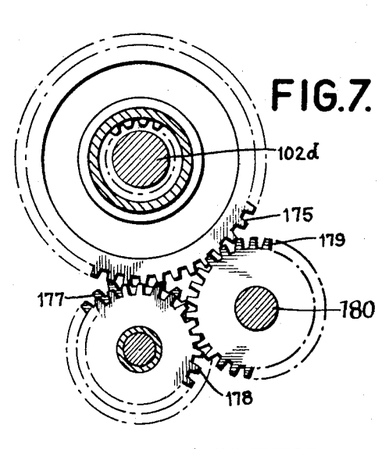
Fig. 7 is a view on line 7—7 of Fig. 6.
Figures 10, 11:
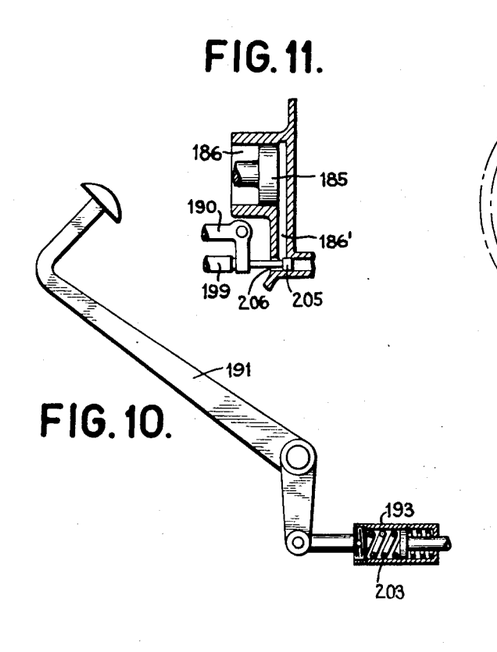
Fig. 10 shows an alternative method of tripping the shift latch through movement of the vehicle clutch pedal when disengaging the clutch.
Fig. 11 illustrates a further method of effecting automatic gear shift.

Referring to Figs. 6 and 7, the main gear 175 mounted on the driven shaft 102d is shifted by a fork 176 and a manual shift lever (not shown), so that movement towards the left for forward speed will mesh gear 175 with idler gear 177 (the latter rigidly connected with gear 178) and movement towards the right for reverse will cause the gear 175 to mesh with the gear 179 on the jackshaft 180 driven as in Fig. 1, for example. Gear 179 is in mesh with the smaller idler gear 178. This main gear 175 has a hollow hub, at each end of which internal teeth are cut to form two clutch members. The tail shaft 102d has mating teeth 181 cut on it and teeth 182 are cut on the right-hand end of the clutch connection member or sleeve 103 of the friction transmission drum 79.

The idler gears 177, 178 are shiftable automatically through the medium of the fork 177' and other parts, described presently. When the vehicle is at rest (and at all times when the pressure in the hydraulic control system for the speed ratio control of the friction transmission falls below a predetermined amount) the idler gears named are shifted into the position shown in Fig. 6 by the spring 183 on the left-hand part of the shifter device 184. The right-hand end of the part 184 carries a piston 185 working in a hydraulic cylinder 186 which is supplied with fluid through a passage 186' by connection to the cylinder (not shown) which operates the friction transmission ratio control, for example the cylinder 46, Fig. 15. If the main gear 175 is shifted to the left into mesh with gear 177, while the main clutch is disengaged, as by depression of its pedal, the vehicle can be started by engaging the clutch. As previosuly explained, all starting shocks and initial operation in low gear are taken through the gears. However, as the engine speed increases and with it of course the vehicle speed, the pressure in the hydraulic system builds up and the friction transmission tends to change to a ratio higher than that of the gears and thus to assume the load. Just before it assumes the whole load the pressure on the automatic shift piston 185 becomes great enough to overcome the tension of spring 183 and thus shift the idler gear 177 out of mesh with main gear 175 and thus disconnect the gear train from the driven or tail shaft 102d. As the vehicle with the engine idling slows down preliminary to a stop the hydraulic pressure again becomes low enough to enable the spring 183 to shift the idler gear into mesh. The teeth of gear 177, however, being backed off as shown in Fig. 8, will not permit the gears to mesh until they have approximately the same speed, that is, until the friction transmission has again reached low ratio.

Other methods for operating the automatic shift are shown more or less diagrammatically in Figs. 6, 9, 10, 11 and 12.

In the method shown in Fig. 6 a latch 190 may be provided to maintain the idler gears out of mesh. This latch may be connected to the vehicle clutch pedal 191, Fig. 10, by a rod 192 through a permissive link 193, so that when the clutch is disengaged the latch is tripped to release the fork 177' and the spring 183 meshes the gears if permitted to do so by the pressure on the piston 185. This avoids any attempted meshing with the attendant noise except when the clutch is disengaged, that is, when the vehicle is running very slowly and about to be brought to a stop. The latch may be rocked clockwise into position to engage fork 177' by a spring 190'.

In another method illustrated in Fig. 6, the latch 190 instead of being tripped by the clutch pedal, is tripped by the rocking or angular movement of the roller of the friction transmission to low gear ratio position thus preventing clash of the gears in meshing. In this construction the roller carrier 197, as its roller reaches the low ratio position, engages and rocks a lever 198 which shifts toward the right a rod 199 connected with the latch 190 in lieu of rod 192, thus swinging the latch out of engagement with the shifter fork 177' (the leftward or advanced position of which is indicated in dotted lines) and allowing the spring 183 to shift gear 177 back into mesh when the hydraulic pressure on piston 185 permits.

If the gears 175, 177 have helical teeth, as in Fig. 9 for example, such teeth tend to keep the gears in mesh as long as they carry any driving load but cause unmeshing as soon as they are relieved of load. When such gears are used the hydraulic cylinder and piston, the spring 183 and the latch, are eliminated and the shifter fork 177' is connected to the clutch pedal, as pedal 191, Fig. 10, by a rod shown in broken lines at 202, Fig. 6, with a permissive link 193, Fig. 10. The spring 203 in the permissive link acts to mesh the gears when the clutch is disengaged and to demesh them if permitted by the load reaction on the helical teeth when the clutch is engaged.

The methods of automatic shift so far described do not provide a gear drive when the friction transmission changes to its lowest ratio under load since in these circumstances the hydraulic pressure would not decrease owing to the maintenence of the driving speed nor would the clutch be disengaged. Such gear drive is provided for in a further method illustrated in Fig. 11. As will be seen from this figure a valve 205 is provided, to be operated by the position of a roller as in Fig. 6. When rod 199 is shifted to the right by the roller the valve is moved past the oil passage 186', as in Fig. 11, thus permitting the oil in the cylinder to drain out through port 206 to the transmission casing (whence it is pumped back to the hydraulic control system as in Fig. 15), and spring 183 can then act to unmesh gears 177 and 175. Movement of the valve to the left, by the pressure of the oil, closes the port and passage 206 to passage 186'.

Figures 12, 14:
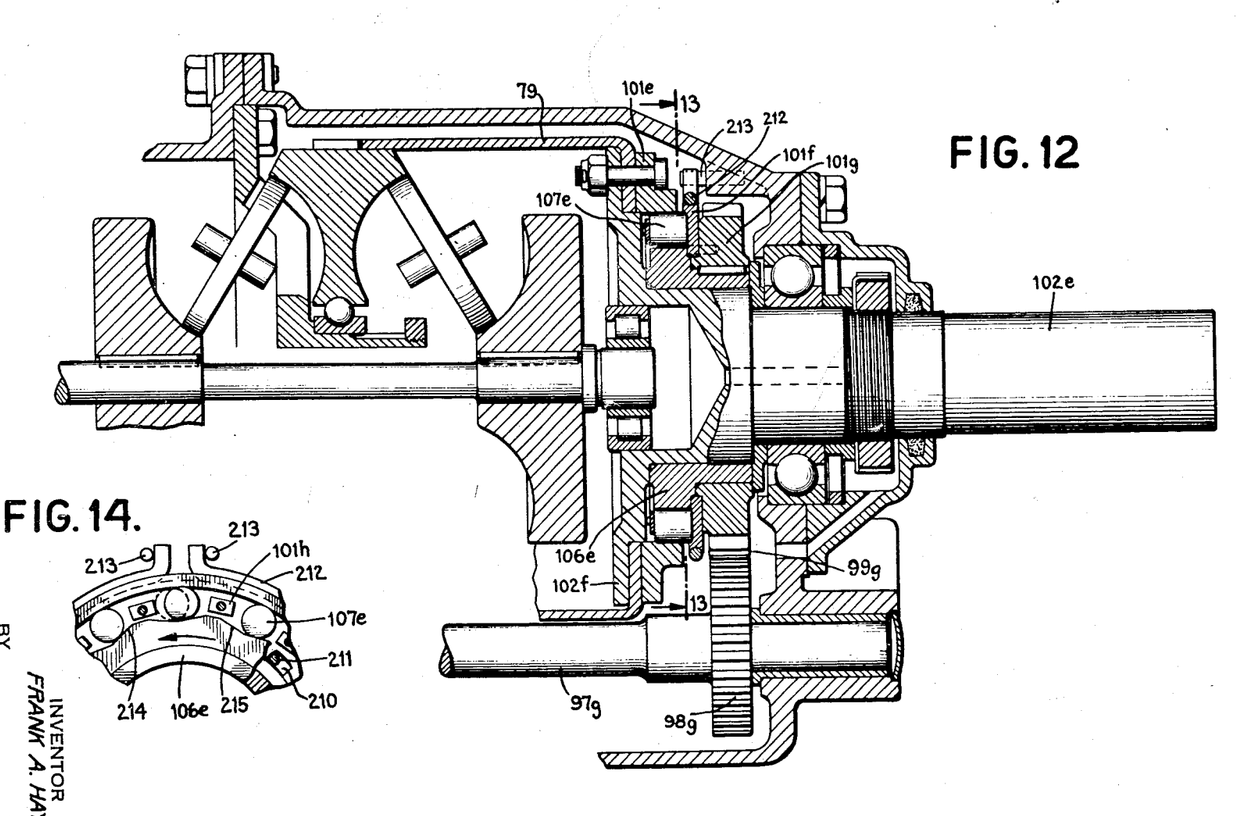
Fig. 12 is a longitudinal section of a further embodiment of the invention in which a double acting free-wheel clutch is employed.
Fig. 14 is a detail view of parts shown in Fig. 13 illustrating a different operative position.
Figure 13:
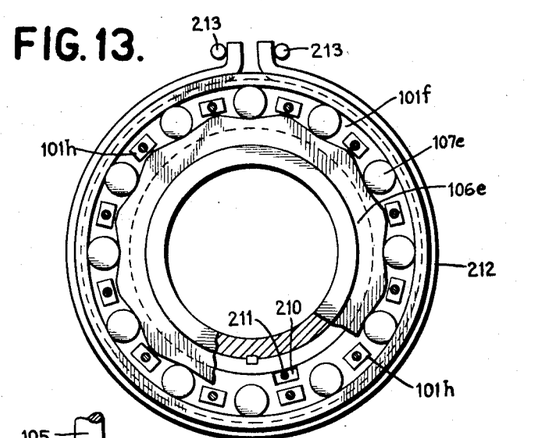
Fig. 13 is a section taken on the line 13—13 of Fig. 12.

Referring to the embodiment of the invention shown in Figs. 12 to 14, this is similar to that illustrated in Fig. 1, but is for use with a friction transmission which is reversible and is driven by a reversible power means. For such use no reverse shift is required but the freewheel clutch is capable of acting as a one-way clutch for either direction of rotation. As shown clearly in Figs. 13 and 14, the cam element 106e is double acting and the rollers 107e are enclosed by clutch-member 101e, secured to the drum 79 of the friction transmission mechanism, and are guided by a cage 101f. The latter is provided with a slot 210 to receive pin 211 projecting from the cam member, so that the cage can have a slight movement of rotation relative to the cam, the extent of such movement being determined by the length of the slot. The outer edge of the cage is shaped for engagement with a friction ring 212, the outwardly turned ends of which lie between pins 213 fixed to the transmission casing. Gear 101g, alongside of cage 101f, is splined or keyed on a rightward extension or hub of the clutch cam-member 106e. The driven shaft 102e has a flange 102f which is connected to the driven drum 79 and to the freewheel clutch member 101e. Gear 101g is connected to gear 98g by means of an idler gear (not shown) between the observer and the plane of Fig. 12.

During operation of the transmission the stationary friction ring 212, Fig. 14, will drag on the cage 101f and cause it to lag behind the cam 106e as far as the pin and slot connection will permit, so that the rollers 107e may engage the lagging cam surfaces 214. The stops 101h of the cage, however, will prevent the rollers from moving far enough the other way to engage the leading cam surfaces 215. When the direction of rotation is reversed the rollers will engage the cam surfaces 215 and be held free of the cam surfaces 214.

It will be obvious from the description of Fig. 1, that the drive from the first motion or drive shaft connected to the motor may go through the friction transmission and cam 106e to the shaft 102e or through the gears 95, 96 (not shown in Fig. 12), shaft 97g, gear 98g, gear 99g meshing with 98g, gear 101g and cam 106e to shaft 102e. The friction transmission is bridged by a toothed gear train which will relieve it of all shock load as in the other embodiments described.

It is to be understood that the invention is not limited to the constructions herein specifically disclosed but can be embodied in other forms without departure from its spirit.

I claim:

1. In a power transmission mechanism, the combination with a variable speed power transmission mechanism of the disk and friction roller type, having driving and driven elements, a driven shaft, and means for driving the latter from the disks and rollers, the rollers being adjustable to vary the speed ratio between the driven and driving elements; of a gear transmission mechanism in parallel with the first named transmission mechanism; and means included in the gear transmission mechanism, to cooperate with both said mechanisms and adapted to drive the driven shaft through the gear transmission when the speed-ratio of the disk and roller transmission is approximately that of the gear transmission.

2. In a power transmission mechanism, the combination with a variable speed power transmission mechanism of the toric disk and friction roller type, having driving and driven elements, a driven shaft, and means for driving the latter from the disks and rollers, the rollers being angularly adjustable to vary the speed ratio between the driven and driving elements; of a gear transmission mechanism in parallel with the first named transmission mechanism; and including means, comprising a shiftable element, included in the gear transmission mechanism, for cooperation with said mechanisms to drive the driven shaft from the gear transmission when the speed-ratio of the disk and roller transmission is approximately that of the gear transmission.

3. In a power transmission mechanism, in combination, a variable speed power transmission mechanism of the disk and friction roller type, having driving and driven elements and a driven shaft, the rollers being adjustable to vary the speed ratio between the driven and driving elements; and gear mechanism to drive the driven shaft directly from one of said elements, said gear mechanism including a free-wheel clutch comprising a driving clutch-member rotatable by one of said elements and a driven clutch-member adapted to rotate the driven shaft from the driving clutch-member when the speed ratio of the disks and rollers is approximately that of the gear mechanism and to rotate idly when the speed ratio of the disks and rollers is higher than that of the gear mechanism.

4. In a power transmission mechanism, in combination, a variable speed power transmission mechanism of the toric disk and friction roller type, having driving and driven elements and a driven shaft rotatable by the driven element, the rollers being angularly adjustable to vary the speed ratio between the driven and driving elements; gear mechanism between the driving element and the driven shaft to rotate the latter directly from the driving element, the gear mechanism including a free-wheel clutch comprising a driving clutch-member rotatable by the driving element and a driven clutch-member rotatable by the driving clutch-member; and means enabling the driven clutch-member to rotate the driven shaft from the driving clutch-member when the speed ratio of the disks and rollers is approximately that of the gear train and to rotate idly when the speed ratio of the disks and rollers is higher than that of the gear train.

5. In a power transmission mechanism, in combination, a variable speed power transmission mechanism of the toric disk and friction roller type, having driving and driven elements and the rollers being angularly adjustable to vary the speed-ratio between the driven and driving elements; a gear train bridging the disks and rollers; a driven shaft to be rotated from the driven element and from the gear train; the gear train including a gear driven by one of said elements; a free-wheel clutch having a driving clutch-member adapted to be driven by the gear, and a clutch-member connected with the driven element and adapted to be driven by the driving clutch-member; and means for driving the driven shaft from the driven clutch-member.

6. In a power transmission mechanism, in combination, a variable speed power transmission mechanism of the toric disk and friction roller type, having driving and driven elements and the rollers being angularly adjustable to vary the speed-ratio between the driven and driving elements; a gear train bridging the disks and rollers; a driven shaft to be rotated from the driven element and from the gear train; the gear train including a gear driven by one of said elements; an axially shiftable free-wheel clutch having a toothed driving clutch-member and a clutch-member connected with the driven element and adapted to be driven by the driving clutch-member; means for shifting the clutch to mesh the driving member thereof with said gear; and means for driving the driven shaft from the driven clutch-member.

7. In a power transmission mechanism, in combination, a variable speed power transmission mechanism comprising disks and cooperating friction rollers, the disks and rollers providing driving and driven elements and the rollers being adjustable to vary the speed ratio between the driven and driving elements; a shaft to be driven by the driven element; gear mechanism bridging the disks and rollers as regards power-transmission; the gear mechanism including a gear driven by the driving element, and a shiftable free-wheel clutch having a toothed driving clutch-member and a driven clutch-member connected with the driven element and adapted to be driven thereby and by the driven clutch-member; means to mesh the driving member of the clutch with said gear; and means connecting the driven clutch-member with the driven shaft when the clutch is shifted to mesh its toothed clutch-member with said gear.

8. In a power transmission mechanism, in combination, a variable speed power transmission mechanism of the toric disk and friction roller type, having driving and driven elements and the rollers being adjustable angularly to vary the speed ratio between the driven and driving elements, a driven shaft; a gear train bridging the disks and rollers to drive the driven shaft at a speed ratio higher than the lowest speed ratio of the disks and rollers; an axially shiftable free-wheel clutch comprising a toothed driving clutch-member and a clutch-member adapted to be driven by the other and connected with the said driven element to be driven thereby independently of the driving clutch-member; a gear driven at a predetermined speed relative to the driving element and arranged to mesh with the toothed clutch-member when the free-wheel clutch is shifted; means connecting the driven clutch-member with the driven shaft when the driving clutch-member is meshed with said gear; and means for shifting the free-wheel clutch.

9. In a power transmission mechanism, in combination, a variable speed power transmission mechanism of the toric disk and friction roller type, having driving and driven elements and the rollers being angularly adjustable to vary the speed ratio between the driven and driving elements; a shaft adapted to be driven by the driven element; a gear train bridging the disks and rollers to drive the driven shaft; the gear train including a gear driven by one of said elements, and an axially shiftable free-wheel clutch having a toothed driving clutch-member and a clutch-member adapted to be driven thereby; means for shifting the clutch in one direction to mesh the driving member thereof with said gear; means connecting the driven clutch-member with the driven shaft when the clutch is shifted to mesh its toothed clutch-member with said gear; and a reverse-drive gear arranged to mesh with the toothed driving clutch-member to drive the driven shaft when the clutch is shifted in the other direction.

10. In a power transmission mechanism, in combination, a variable speed power transmission mechanism of the toric disk and friction roller type, having driving and driven elements, and the rollers being adjustable angularly to vary the speed ratio between the driven and driving elements; a shaft adapted to be driven by the driven element; a gear train bridging the disks and rollers to drive the driven shaft at a speed ratio higher than the lowest speed ratio of the disks and rollers; an axially shiftable free-wheel clutch comprising a toothed clutch-member, a driven clutch-member shiftable with the toothed clutch-member and adapted to be driven thereby and by the driven element; said gear train having a gear driven at a predetermined speed relative to the driving element and arranged to mesh with the toothed clutch-member when the free-wheel clutch is shifted in one direction; means connecting the driven clutch-member with the driven shaft when the clutch is so shifted; a reverse-drive gear arranged to mesh with the driving clutch-member to drive the driven shaft when the clutch is shifted in the other direction; and means for shifting the clutch.

11. A variable speed power transmission mechanism comprising, in combination, toric disks and cooperating friction rollers providing driving and driven elements; a gear train bridging the disks and rollers; a driven shaft to be driven by the gear train and by said driven element; means for varying the transmission speed-ratio of the disks and rollers; and a free-wheel clutch forming part of the gear train and associated with the driven shaft and the driven element to drive the driven shaft from the gear train when the transmission ratio of the latter and that of the disks and rollers are approximately the same, the clutch having means adapted to drive the driven shaft from the driven element when the transmission ratio of the gear train is less than that of the disks and rollers.

12. A variable speed power transmission mechanism comprising, in combination, toric disks and cooperating friction rollers providing driving and driven elements, the rollers being mounted for angular adjustment to vary the transmission speed-ratio between the driven and driving elements; a driving shaft to rotate the driving element; a driven shaft; and a gear train between the driving shaft the driven shaft and bridging the toric disks and friction rollers to drive the driven shaft directly from the driving shaft, said gear train having a transmission speed-ratio, between the driven shaft and the driving shaft, higher than the lowest transmission speed-ratio of the disks and rollers; the gear train including a gear driven by the driving shaft at the input end thereof and a free-wheel clutch having clutch members and interposed rolling members, one of said clutch members adapted to be driven by the said gear, the other clutch-member connected with the driven shaft to drive the same and adapted to be driven by the first-named clutch member through the rolling members for direct transmission of power between the driving shaft and the driven shaft when the transmission speed-ratio of the disks and rollers is approximately the transmission speed-ratio of the gear train.

13. In a power transmission mechanism, in combination, a variable speed power transmission mechanism comprising toric disks and co-operating friction rollers, the disks and rollers providing driving and driven elements and the rollers being adjustable angularly to vary the speed ratio between the driven and driving elements; a driven shaft; a counter-shaft driven at a predetermined angular speed relative to the driving element and in parallel with the disks and rollers as regards power transmission; an axially shiftable free-wheel clutch comprising a toothed driving clutch-member, and a driven clutch-member connected with the driven element and shiftable with the driving clutch-member for engagement with and disengagement from the driven shaft; a gear driven by the counter-shaft and arranged to mesh with the toothed clutch-member when the free-wheel clutch is shifted to connect the driven clutch-member with the driven shaft; and means for shifting the free-wheel clutch.

14. A variable speed power transmission mechanism comprising, in combination, toric disks and cooperating friction rollers providing driving and driven elements, the rollers being mounted for angular adjustment to vary the speed ratio between the driven and driving elements; a driving shaft to rotate the driving element; a driven shaft to be rotated by the driven element; a gear train comprising: a countershaft driven from the driving shaft and bridging the toric disks and friction rollers to drive the driven shaft directly from the driving shaft, a free-wheel clutch having clutch members and interposed rolling members; a gear to rotate one of said clutch-members from the countershaft, the other clutch-member being connected with the driven element to be driven thereby and adapted to be driven by the first-named clutch member through the rolling members; and means for connecting the driven clutch-member with the driven shaft for direct transmission of power between the driving shaft and the driven shaft through the gear train, or by the driven element for transmission of power between the same and the driving shaft through the disks and rollers, according as the speed ratio between the driven element and the driving element of the friction transmission is less or greater than the speed ratio of the gear train.

15. In a power transmission mechanism, in combination, a power input element, a power output element, infinitely variable speed-ratio mechanism to drive the latter element from the first named, a free-wheel clutch mechanism having driving and driven clutch members, means connecting the driven clutch member with said power output element, and a fixed-ratio transmission mechanism between said power input element and the driving clutch member.

16. A combination set forth in claim 3, in which the driven clutch member, the driven element of the disk and roller transmission mechanism, and the driven shaft, are permanently connected together, and the driving clutch member is reversible in its effect.

17. In a power transmission mechanism, in combination, a variable speed power transmission mechanism comprising toric disks and cooperating friction rollers, a driving element, a driven element, and a driven shaft connected with the driven element for rotation thereby from the disks and rollers, the rollers being adjustable to vary the speed ratio between the driving element and the driven element; a free-wheel having a driven clutch-member connected with the driven shaft to drive the same, a double-acting driving clutch-member to drive the driven clutch members; gearing connecting the driving element with the driving clutch-member to rotate the latter in one direction or the other according to the direction of rotation of the driving element; and means acting to reverse the direction of drive of the driving clutch element when its direction of rotation is reversed.

18. In a power transmission mechanism, in combination, a variable speed power transmission mechanism comprising toric disks and co-operating friction rollers, a driving element, a driven element, and a driven shaft connected with the driven element for rotation thereby from the disks and rollers, the rollers being adjustable to vary the speed ratio between the driving element and the driven element; a free-wheel having a driven clutch-member connected with the driving element and the driven shaft to drive the latter, a double-acting driving clutch-member loosely mounted on the driven shaft, and rolling bodies between the clutch-members to drive the driven shaft from the driven clutch-member; gearing connecting the driving element with the driving clutch-member to rotate the latter in one direction or the other according to the direction of rotation of the driving element; and means cooperating with the rolling bodies to reverse the direction of drive of the driving clutch element when its direction of rotation is reversed.

19. In a power transmission mechanism, in combination, a variable speed power transmission mechanism comprising toric disks and cooperating friction rollers, a driving element, a driven element, and a driven shaft connected with the driven element for rotation thereby from the disks and rollers, the rollers being adjustable to vary the speed ratio between the driving element and the driven element; a free-wheel having a driven clutch-member connected with the driven shaft to drive the same, a driving clutch-member having oppositely inclined cam-surfaces, and rolling bodies between the clutch-members; gearing connecting the driving element with the driving clutch-member to rotate the latter in one direction or the other according to the direction of rotation of the driving element; and means acting to confine the rolling bodies to cam-surfaces of one inclination or the other according to the direction of rotation of the driving clutch-member by the driving element.

20. The combination set forth in claim 19, in which the means acting on the rolling bodies is a cage shiftable by the change of the direction of rotation of the driving clutch-member.

21. In a power transmission mechanism, the combination of a variable speed power transmission mechanism of the toric disk and friction roller type, having driving and driven elements; a driving shaft; a driven shaft; a free-wheel clutch adjacent to the input end of the driving shaft, having driving and driven members, the driven member being connected with the driven shaft to drive the same; gearing at the input end of the driving shaft to drive the driving clutch member; means for connecting the driven element with the driven clutch-member to drive the driven shaft therethrough, said means comprising a shaft and gearing connecting the same with the driven element of the disk and roller transmission for actuation thereby; an output shaft at an angle to the driven shaft; and gearing connecting the output shaft with the driven shaft for rotation thereby.

22. The combination set forth in claim 21, in which the gearing at the input end of the driving shaft comprises a forward drive gear and a reverse drive gear, and the free-wheel clutch is shiftable axially on the driven shaft to mesh the driving clutch-member with either gear.

23. In a power transmission mechanism, in combination, a variable speed power transmission mechanism of the toric disk and friction roller type, having driving and driven elements and the rollers being angularly displaceable to vary the speed ratio between the driven and driving elements; a gear train bridging the disks and rollers; a driven shaft coaxial with the driven element; the gear train including a clutch-driving gear driven from the driving element; a free-wheel clutch coaxial with the driven shaft and shiftable axially, the clutch having a driven member slidable on the driven element but rotatable thereby, and a driving member comprising a gear shiftable into and out of mesh with the clutch-driving gear; and means carried by the driven clutch-member to engage and drive the driven shaft when the driving clutch-member is shifted to mesh its gear with the clutch-driving gear.

24. In a power transmission mechanism, in combination, a variable speed power transmission mechanism of the toric disk and friction roller type, having driving and driven elements, the driven element having a coaxial sleeve and the rollers being angularly displaceable to vary the speed ratio between the driven and driving elements; a gear train bridging the disks and rollers and having a clutch-driving gear driven from the driving element; a driven shaft journaled in said sleeve and rotatable relatively thereto; a free-wheel clutch having a driven member splined on said sleeve to slide thereon, and a driving member slidable with the driven member; a gear slidable on the driven shaft and connected with the driving clutch-member to rotate the same; means for shifting the clutch to mesh said gears; and means carried by the driven clutch-member to drive the driven shaft when the clutch is shifted.

25. In a power transmission mechanism, in combination, a variable speed power transmission mechanism of the toric disk and friction roller type, having driving and driven elements, the driven element having a coaxial sleeve and the rollers being angularly displaceable to vary the speed ratio between the driven and driving elements; a gear train bridging the disks and rollers and having a forward clutch-driving gear and a reverse clutch-driving gear; a driven shaft journaled in said sleeve and rotatable relatively thereto; a free-wheel clutch having a driven member splined on said sleeve to slide thereon and a driving member slidable with the driven member; a gear slidable on the driven shaft and connected with the driving clutch-member to rotate the same; means for shifting the clutch in one direction to mesh its gear with the forward clutch-driving gear and in another direction to mesh its gear with the reverse clutch-driving gear; means acting to connect the driven clutch member with the driven shaft when the free-wheel clutch is shifted in one direction; and means to connect the driving clutch-member with the driven shaft when the free-wheel clutch is shifted in the other direction.

26. In a power transmission mechanism, in combination, a variable speed power transmission mechanism of the toric disk and friction roller type, having driving and driven elements, the driven element having a coaxial sleeve and the rollers being angularly displaceable to vary the speed ratio between the driven and driving elements; a gear train bridging the disks and rollers and having forward and reverse clutch-driving gears driven from the driving element; a driven shaft journaled in said sleeve for rotation relatively thereto and having an enlargement adjacent to the end of said sleeve; a free-wheel clutch having a driven member splined on said sleeve to slide thereon, and a driving member slidable with the driven member; a gear slidable on the enlargement of the driven shaft and connected with the driving clutch-member to rotate the same; means for shifting the clutch to mesh its gear with either of the other of said gears; clutch means carried by opposed faces of the driven clutch-member and the enlargement of the driven shaft to connect said member and said enlargement when the clutch is shifted to mesh its gear with the forward gear; and clutch means carried by the said enlargement and the clutch gear to connect the latter with the said enlargement when the free-wheel clutch is shifted to mesh its gear with the reverse gear.

FRANK A. HAYES.